(12) United States Patent
Hama (10) Patent No.: US 9,094,560 B2
(45) Date of Patent: Jul. 28, 2015

(54) FACSIMILE SYSTEM THAT PACKETIZES AND TRANSMITS CODED IMAGE DATA

(71) Applicant: CANON KABUSHIKI KAISHA, Tokyo (JP)

(72) Inventor: Mikio Hama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/048,530

(22) Filed: Oct. 8, 2013

(65) Prior Publication Data
US 2014/0098406 A1    Apr. 10, 2014

(30) Foreign Application Priority Data

Oct. 10, 2012  (JP) ................................ 2012-224994

(51) Int. Cl.
*H04N 1/00*   (2006.01)
*H04N 1/32*   (2006.01)

(52) U.S. Cl.
CPC ......... *H04N 1/00962* (2013.01); *H04N 1/0022* (2013.01); *H04N 1/32614* (2013.01); *H04N 1/32683* (2013.01); *H04N 2201/0025* (2013.01); *H04N 2201/0062* (2013.01); *H04N 2201/0093* (2013.01)

(58) Field of Classification Search
None
See application file for complete search history.

(56) References Cited

U.S. PATENT DOCUMENTS

| | | | |
|---|---|---|---|
| 6,438,105 B1* | 8/2002 | Qarni et al. | 358/425 |
| 6,757,367 B1* | 6/2004 | Nicol | 379/90.01 |
| 2003/0112796 A1* | 6/2003 | Kwan | 370/352 |
| 2004/0042467 A1* | 3/2004 | Abrishami et al. | 370/401 |
| 2011/0080837 A1* | 4/2011 | Kawabata et al. | 358/1.15 |

FOREIGN PATENT DOCUMENTS

| | | |
|---|---|---|
| JP | 9-163119 A | 6/1997 |
| JP | 2009-212998 A | 9/2009 |

* cited by examiner

*Primary Examiner* — Kimberly A Williams
(74) *Attorney, Agent, or Firm* — Canon USA, Inc., I.P. Division (57) ABSTRACT

In a facsimile system including a gateway apparatus and a transmission-side facsimile apparatus capable of performing facsimile communication via the gateway apparatus, the transmission-side facsimile apparatus codes image data, and packetizes the coded image data so that one line is included in one packet, and transmits the packetized image data to the gateway apparatus. The gateway apparatus receives a packet transmitted from the transmission-side facsimile apparatus, inserts predetermined data into image data included in the received packet, and transmits the image data into which the predetermined data has been inserted, to a receiving-side facsimile apparatus.

22 Claims, 11 Drawing Sheets

FACSIMILE SYSTEM THAT PACKETIZES AND TRANSMITS CODED IMAGE DATA

BACKGROUND

1. Field of the Disclosure

Aspects of the present invention generally relate to a facsimile system that packetizes and transmits coded image data, a facsimile apparatus and a communication method in the facsimile system, a method for controlling the facsimile apparatus, and a storage medium.

2. Description of the Related Art

In recent years, an internet protocol facsimile (IPFAX) apparatus, which performs FAX transmission/receiving using an IP network, has been paid attention to. The IPFAX is listed as one of contents in a public IP network (a next generation network (NGN) provided by NIPPON TELEGRAPH AND TELEPHONE CORPORATION (NTT), in Japan.

A conventional analog facsimile apparatus (analog FAX) can also be connected to the public IP network via International Telecommunication Union-Telecommunication (ITU-T) recommendation T.38 (herein below referred to as "T.38") gateway (GW). Call connection and data communication between IPFAXs are respectively performed using a Session Initiation Protocol (SIP) and a T.38 protocol, although details thereof are omitted because the technique is known. As discussed in Japanese Patent Application Laid-Open No. 9-163119, a T.38 GW converts SIP call connection into analog telephone call connection and converts a T.38 protocol into an ITU-T recommendation T.30 (herein below referred to as "T.30") protocol in real time, to enable mutual communication between an IPFAX and an analog FAX.

FAX communication includes error correction mode (ECM) communication in which error correction can be performed (error correction is performed) and non-ECM communication in which error correction cannot be performed (error correction is not performed).

"ECM communication" means dividing image data into blocks, dividing each of the blocks into some frames each including 256 bytes, and transmitting the frame to a partner. A receiving side determines an error every time it receives one frame, repeats the error determination until it has received one block, and requests, if an error frame has existed at the time point where it has received one block, a transmission side to retransmit the error frame. The transmission side has a function of retransmitting only the frame in which an error has occurred. In ECM communication, a flag for maintaining synchronization between the frames is usually sent out. Image data, which has been missing due to noise on a line, is retransmitted so that line missing does not occur.

However, the analog FAX includes one of a type incapable of ECM communication. In such a case, communication between the IPFAX and the analog FAX is performed in non-ECM. In non-ECM communication, when an error occurs during communication of an image signal, the error becomes an error for each line so that the line is missing. In non-ECM communication, an image compression system includes a modified Huffman (MH) coding system and a modified relative element address designate (MR) coding system. The MH coding system and the MR coding system are systems for coding for each line data, although detailed description thereof is omitted.

While the transmission side sequentially connects and transmits coded lines, a code called end of line (EOL) is added between the coded lines. The coded line is sandwiched between EOL codes, resulting in (EOL+line data+EOL). The last line of one page is coded, and a code called return to control (RTC) is added to the end of the last coded line. A sequence of six EOL codes forms a RTC code. Therefore, the last line becomes (EOL+DATA+RTC).

Consider a case where non-ECM data is transmitted from the IPFAX to the analog FAX, for example. A T.38 GW includes a buffer of a certain size in its inner part. Data transmitted from the IPFAX is temporarily stored in the buffer, and the data in the buffer is transmitted to the analog FAX connected to the T.38 GW in real time. The buffer in the T.38 GW is generally as small as several lines of FAX data, and the whole FAX data cannot be stored. The IPFAX and the T.38 GW are connected to each other via an IP network, and the T.38 GW and the analog FAX are connected to each other via an analog network. The T.38 GW and the analog FAX usually communicate with each other at a negotiated speed. The maximum speed is 14400 bps defined by ITU-T V.17, for example. The IPFAX and the T.38 GW are usually connected to each other via the IP network having a speed higher than 14400 bps. Therefore, when the IPFAX performs data transmission to the T.38 GW at a speed of 14400 bps or more, the buffer inside the T.38 GW overflows, and overruns.

To solve the above-described overrun, a transmission speed from the IPFAX to the T.38 GW is made equal to a transmission speed from the T.38 GW to the analog FAX. However, a packet may be delayed on the IP network. In such a case, data is not transmitted at a sufficient speed from the IPFAX to the T.38 GW. As a result, the T.38 GW may underrun. The T.38 GW has a function of transmitting data without any interruption from the T.38 GW to the analog FAX by adding "FILL" (i.e., data 0) to the non-ECM data which has been transmitted from the IPFAX, if such underrun occurs. In conventional communication between analog FAXs without via the T.38 GW, the analog FAX on the side of a transmission apparatus inserts FILL. The transmission apparatus adds FILL to the end of line data in the above-described line data (EOL+line data+EOL) so as not to cause underrun when the line is coded. Thus, line data (EOL+line data+FILL+EOL) is formed. While FILL is zero data, a plurality of pieces of FILL is inserted so that no underrun occurs. FILL needs to be inserted at the end of the line data and in front of EOL (or the end of the line data and in front of RTC). If Fill is inserted into other positions, coded data is destroyed, and cannot be decoded.

If the analog FAX has an ECM communication function, and ECM communication is selected in data transmission from the IPFAX to the analog FAX, there is no problem even if the above-described frame transmission is not on time. The IPFAX packs one frame (256 Bytes) in one T.38 data packet, and transmits the T.38 data packet to the T.38 GW. In ECM communication, the T.38 GW inserts the above-described flag as an underrun measure between frames. Since the flag is inserted into a place where the flag has originally existed, so that data inside the frame is not destroyed. On the other hand, in non-ECM, framing is not performed, unlike in ECM communication. Thus, a place into which FILL can be inserted, as described above, is restricted.

In data transmission from the IPFAX to the IPFAX, non-ECM communication is hardly performed. Even if non-ECM communication is performed, communication at a speed obtained by a capability exchange (a digital identification signal (DIS) and a digital command signal (DCS)) of a conventional FAX is not performed, and communication is performed at a network speed. Therefore, no underrun and no overrun occur from the above-described reason.

Image communication from the IPFAX to the T.38 GW is performed using a T.38 data packet defined in T.38 recommendation, and data transmission to the IP network is performed using an IP packet. The maximum size of the IP packet is approximately 1500 Bytes. One IP packet cannot contain the whole data on one page of a FAX text. Therefore, text data on one page is divided, and the divided data is packed in an IP packet and is transmitted from the IPFAX to the T.38 GW. Conventionally, text data on one page is transmitted from the IPFAX to the T.38 GW after being divided into a determined fixed size. Each of lines in the text is compressed. Thus, sizes of the lines after the compression differ. Accordingly, if the text data is divided into the fixed size, FILL is inserted into the middle of one line of FAX data in non-ECM when a packet is delayed. More specifically, the line becomes (EOL+middle of line data+FILL+the middle to the end of line data+EOL). Thus, coded data is destroyed, and cannot be decoded.

As described above, FILL can be inserted without affecting decoding of the coded data only at the end of the line data and in front of EOL (or at the end of the line data and in front of RTC). If data is transmitted in non-ECM from the IPFAX to the T.38 GW, like in the conventional technique, one line of the data is separated in the middle. Consequently, the T.38 GW inserts FILL into the middle of the line of the data. Thus, coded data is destroyed, and is transmitted to the analog FAX. Therefore, the coded data cannot be decoded in the analog FAX so that image transmission is unsuccessfully performed.

While T.38, a T.38 GW, and non-ECM communication are described above as an example, similar issues occur even in a transmission control protocol, and a gateway and communication using the transmission control protocol.

SUMMARY

Aspects of the present invention is generally directed to enabling decoding of data in an analog FAX apparatus connected to a gateway serving as a communication partner.

According to an aspect of the present invention, a facsimile system includes a gateway apparatus, and a transmission-side facsimile apparatus capable of performing facsimile communication via the gateway apparatus. The gateway apparatus includes a receiving unit configured to receive a packet transmitted from the transmission-side facsimile apparatus, an insertion unit configured to insert predetermined data into image data included in the packet received by the receiving unit, and a first transmission unit configured to transmit image data into which the predetermined data is inserted by the insertion unit to a receiving-side facsimile apparatus. The transmission-side facsimile apparatus includes a coding unit configured to code image data, and a second transmission unit configured to packetize image data coded by the coding unit so that one line is included in one packet, and to transmit the packetized image data to the gateway apparatus.

Further features and aspects of the present disclosure will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

Figure 1:
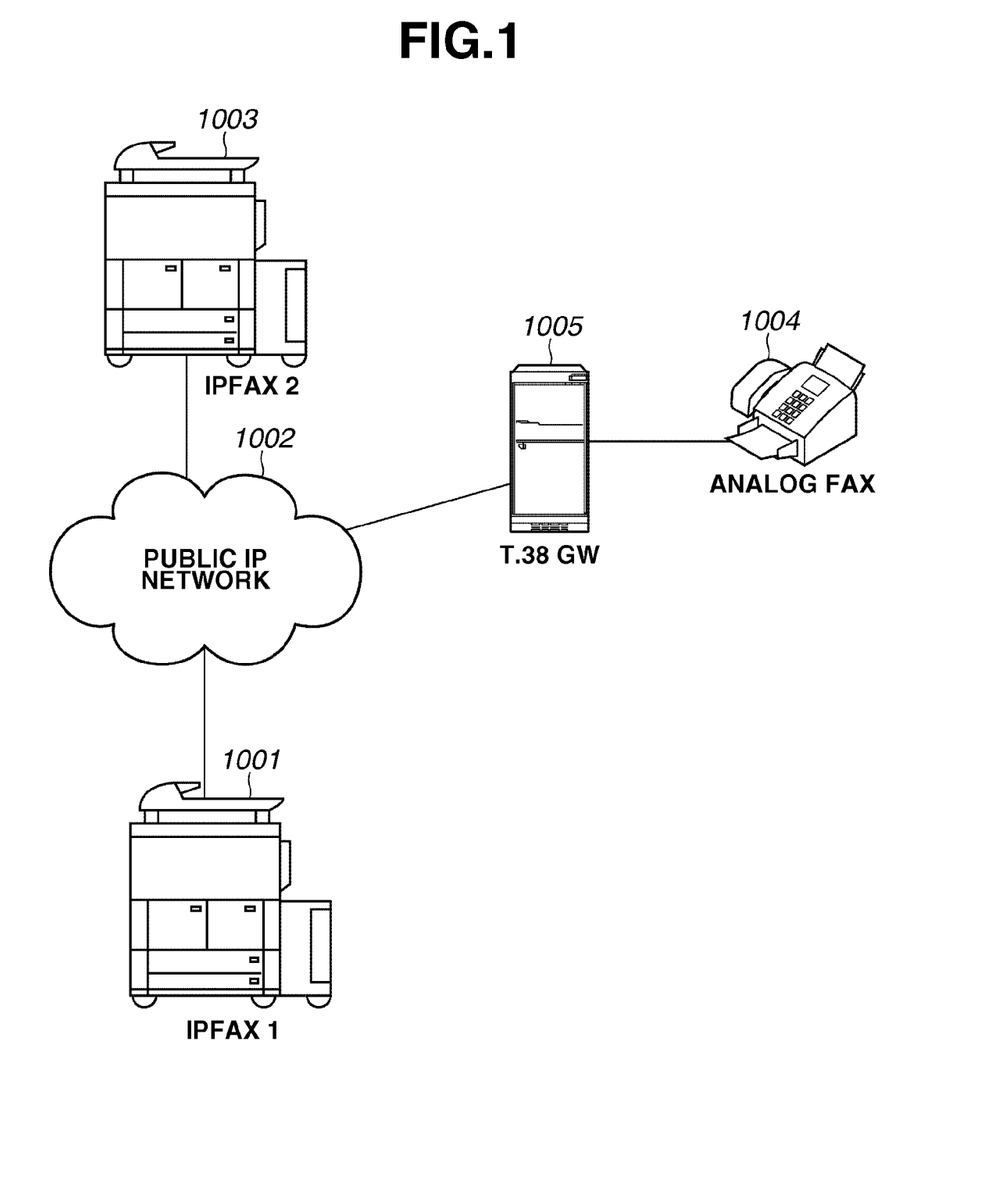
FIG. 1 illustrates an example of a system configuration of a system including an IPFAX apparatus.

FIG. 1 illustrates an example of a system configuration of a system including an IPFAX apparatus (hereinbelow referred to as an IPFAX). The IPFAX is an example of an image processing apparatus. In FIG. 1, an IPFAX1 1001 and an IPFAX2 1003 are connected to a public IP network 1002. A T.38 gateway (T.38 GW) 1005 is connected to the public IP network 1002 and an analog FAX 1004 is beyond the T.38 GW 1005.

The IPFAX1 1001 and the IPFAX2 1003 communicate with each other using a T.38 protocol. T.38 (ITU-T recommendation T.38) is a protocol for performing FAX communication in real time on an IP network. Session connection between IPFAXs in the public IP network is performed using an SIP, and is performed using an SIP server having a function of converting a telephone number into an IP address and a proxy function. In addition, a gateway is required to connect the IPFAX to the public IP network.

The T.38 GW is a gateway for converting a T.38 protocol into a T.30 protocol in real time that is used in a conventional analog group 3 facsimile (G3 FAX). The T.38 GW can connect an IPFAX and an analog FAX.

Figure 2:
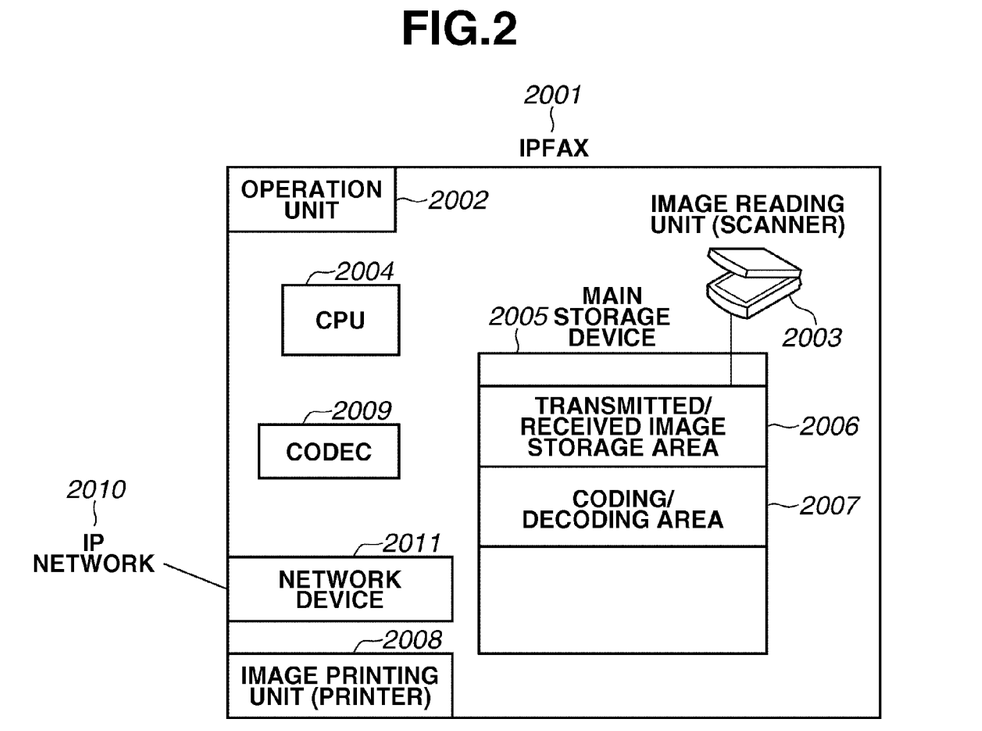
FIG. 2 illustrates an example of a hardware configuration of an IPFAX.

FIG. 2 illustrates an example of a hardware configuration of the IPFAX. In FIG. 2, an IPFAX 2001 corresponds to the IPFAX1 1001 or the IPFAX2 1003 illustrated in FIG. 1. An operation unit 2002 includes a keyboard, a display unit, and the like, and is used for an operator to perform various input operations. An image reading unit 2003 is a scanner, and reads a transmitted image. A central processing unit (CPU) 2004 is an arithmetic device in the IPFAX 2001. A main storage device 2005 is used to store a program to be operated by the CPU 2004 and image data.

A transmitted/received image storage area 2006 temporarily stores a transmitted image read by the image reading unit 2003, or primarily stores a received image, and is an area within the main storage device 2005. A coding/deciding area 2007 temporarily stores data that is coded and decoded by a coder/decoder (CODEC) 2009, and is an area within the main storage device 2005. An image printing unit 2008 is a printer, and prints a received image. The CODEC 2009 performs coding and decoding.

An IP network 2010 corresponds to the public IP network 1002 in FIG. 1. A network device 2011 connects the IPFAX 2001 to the IP network 2010, and transmits and receives IP data. The CPU 2004 performs processing based on the program stored in the main storage device 2005, to implement a function of the IPFAX 2001 and processing related to a flowchart of the IPFAX 2001, described below.

Similarly, the T.38 GW 1005 also includes a CPU and a main storage device. The CPU in the T.38 GW 1005 performs processing based on a program stored in the main storage device in the T.38 GW 1005, to implement a function of the T.38 GW 1005. Similarly, the analog FAX 1004 also includes a CPU and a main storage device. The CPU in the analog FAX 1004 performs processing based on a program stored in the main storage device in the analog FAX 1004, to implement a function of the analog FAX 1004.

Figure 3:
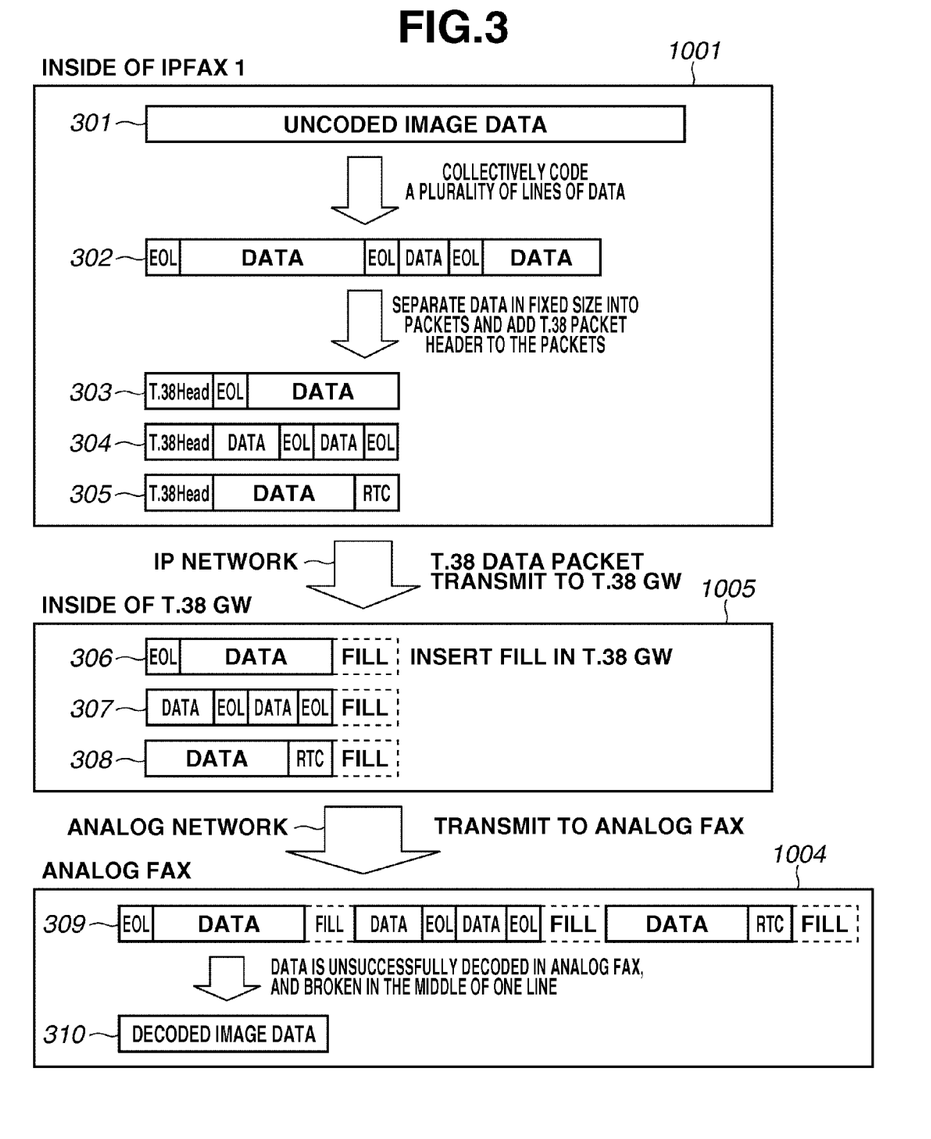
FIG. 3 is a processing flow related to image data within an IPFAX, a T.38 GW, and an analog FAX during non-ECM transmission, and illustrates a case where image data is transmitted from the IPFAX to the T.38 GW without being separated at end of line (EOL) of a transmitted image according to a conventional technique.

FIG. 3 is a processing flow related to image data within the IPFAX1 1001, the T.38 GW 1005, and the analog FAX 1004 during non-ECM transmission, and illustrates a case where the image data is transmitted from the IPFAX1 1001 to the T.38 GW 1005 without being separated at an EOL of the transmitted image data according to a conventional technique.

The T.38 GW 1005 exchanges a capability with the analog FAX 1004, and the analog FAX 1004 requests the T.38 GW 1005 to perform transmission in non-ECM. A basic communication method between the T.38 GW 1005 and the IPFAX1 1001 is a known technique, and hence description thereof is omitted. Non-ECM communication is communication in which error correction cannot be performed, as described above.

An image scanned by the image reading unit 2003 in the IPFAX1 1001 is stored as uncoded image data 301 in the transmitted/received image storage area 2006 in the IPFAX1 1001. The CODEC 2009 in the IPFAX1 1001 codes the uncoded image data 301. Coded data 302 is temporarily stored in the coding/decoding area 2007 in the IPFAX1 1001.

If data within a T.38 data packet has a determined length, like in the conventional technique, the coded data 302 is to be separated in the middle of one line into data pieces 303, 304, and 305. The data pieces 303, 304, and 305 to which a T.38 packet header is added are transmitted as the T.38 data packet from the IPFAX1 1001 to the T.38 GW 1005.

As described above, the IPFAX1 1001 performs data transmission to the T.38 GW 1005 according to a speed determined by exchanging the capability between the T.38 GW 1005 and the analog FAX 1004. The T.38 GW 1005 converts a T.38 protocol within the T.38 data packet which has been received from the IPFAX1 1001 into a T.30 protocol in real time, and transmits the T.30 protocol to the analog FAX 1004. If the speed of the data to be transmitted from the IPFAX1 1001 to the T.38 GW 1005 is lower than a capability exchange speed because a delay occurs, the T.38 GW 1005 inserts FILL into each of the data pieces 303, 304, and 305 transmitted as the T.38 data packet to obtain data pieces 306, 307, and 308. Then, the T.38 GW 1005 transmits the data pieces 306, 307, and 308 to the analog FAX 1004 after the speed thereof is matched with the capability exchange speed. Therefore, in non-ECM image data 309 that has been received by the analog FAX 1004, as described above, FILL (zero data) is inserted between DATA and DATA. Since the zero data is inserted into the middle of the coded data, the image data 309 is unsuccessfully decoded into decoded image data 310.

Figure 4:
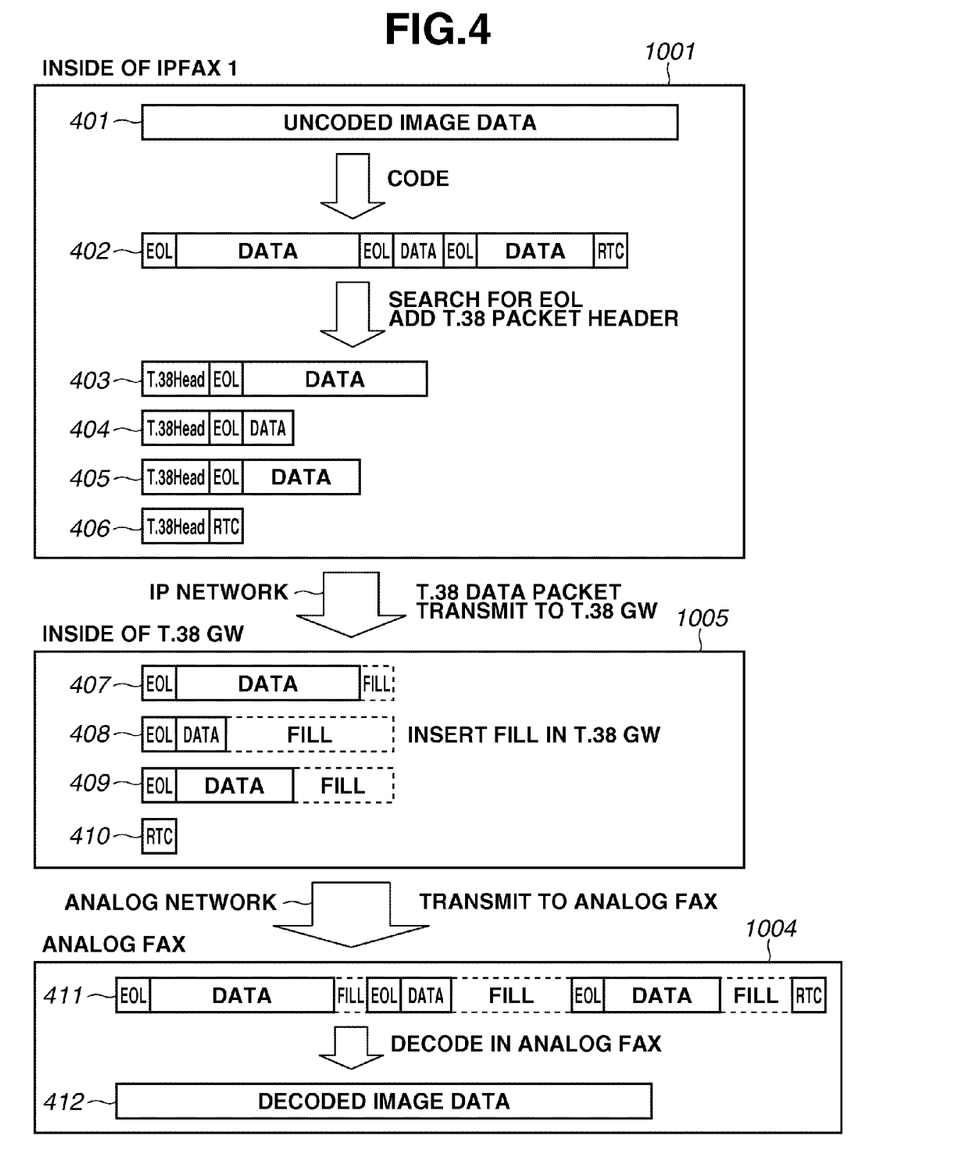
FIG. 4 illustrates an example of information processing related to image data within an IPFAX, a T.38 GW, and an analog FAX during non-ECM transmission according to a first exemplary embodiment.

FIG. 4 is a processing flow related to image data within the IPFAX1 1001, the T.38 GW 1005, and the analog FAX 1004 during non-ECM transmission, and illustrates processing according to a first exemplary embodiment. An image scanned by the image reading unit 2003 in the IPFAX1 1001 is stored as uncoded image data 401 in the transmitted/received image storage area 2006 in the IPFAX1 1001. The CODEC 2009 in the IPFAX1 1001 codes the uncoded image data 401. The coded data 402 is temporarily stored in the coding/decoding area 2007 in the IPFAX1 1001.

The following processing is performed in the present exemplary embodiment.

1. The CPU 2004 first searches the coded data 402 for end of the line (EOL) and end of the page (RTC). More specifically, the CPU 2004 searches coded data including a plurality of lines for "end of line" and "end of page". Thus, the CPU 2004 searches for a first pattern "end of line+line data+end of line" (i.e., EOL+DATA+EOL) and a second pattern "end of line+line data+end of page" (i.e., EOL+DATA+RTC). Then, the CPU 2004 sets a portion from EOL up to but not including the subsequent EOL and a portion from EOL up to but not including RTC as one set. The CPU 2004 handles data 406 including only RTC as an independent set.

2. Then, the CPU 2004 adds a T.38 packet header to EOL+ DATA (i.e., end of line+line data) and RTC, which have been separated in the above processing 1, to generate data pieces 403, 404, 405, and 406. The CPU 2004 sequentially transmits the data pieces 403, 404, 405, and 406 as T.38 data packets from the IPFAX1 1001 to the T.38 GW 1005.

As described above, the IPFAX1 1001 performs data transmission to the T.38 GW 1005 according to a speed determined by exchanging a capability between the T.38 GW 1005 and the analog FAX 1004. The T.38 GW 1005 converts a T.38 protocol within the T.38 data packet which has been received from the IPFAX1 1001 into a T.30 protocol in real time, and transmits the T.30 protocol to the analog FAX 1004. If the speed of the data to be transmitted from the IPFAX1 1001 to the T.38 GW 1005 is lower than a capability exchange speed, the T.38 GW 1005 insets FILL into each of the data pieces 403, 404, 405, and 406 as the T.38 data packets to obtain data pieces 407, 408, 409, and 410. Then, the T.38 GW 1005 then transmits the data pieces 407, 408, 409, and 410 to the analog FAX 1004 after the speed thereof is matched with the capability exchange speed. In this case, the T.38 GW 1005 inserts FILL behind DATA and in front of EOL, like in the data pieces 407, 408, and 409.

According to the present exemplary embodiment, in non-ECM image data 411, which has been received by the analog FAX 1004, as described above, FILL (zero data) is inserted behind DATA. In this case, the image data 411 can be decoded, unlike in the conventional technique.

Figure 5:
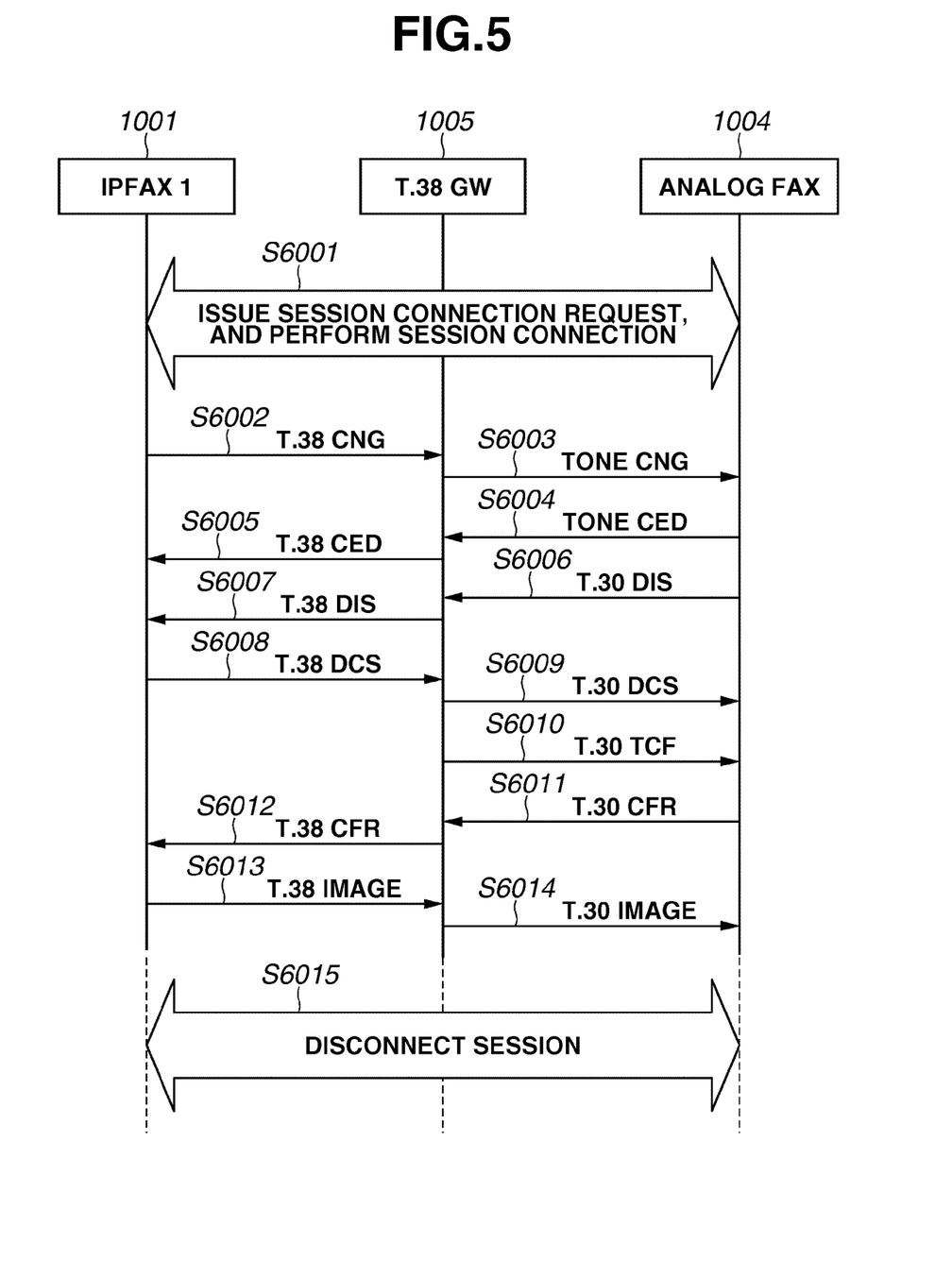
FIG. 5 is a sequence diagram illustrating a case where image transmission is performed from an IPFAX to an analog FAX beyond a T.38 GM.

FIG. 5 is a sequence diagram illustrating a case where image transmission is performed from the IPFAX1 1001 to the analog FAX 1004 beyond the T.38 GW 1005. FIG. 5 corresponds to image transmission from the IPFAX1 1001 to the analog FAX 1004 in FIG. 1. In step S6001, the IPFAX1 1001 transmits a session (call) connection request to the analog FAX 1004, and performs session connection. The T.38 GW 1005 converts the IPFAX session connection request from the IPFAX1 1001 into an analog session control request, and issues the session connection request to the analog FAX 1004. More specifically, the T.38 GW 1005 converts an INVITE message of the SIP into a dial request for analog call connection, for example.

If a session is established through the session connection, then in step S6002, the IPFAX1 1001 transmits a T.38 calling tone (CNG) signal to the T.38 GW 1005. In step S6003, the T.38 GW 1005 converts the T.38 CNG into a CNG having an analog tone, and transmits the CNG having an analog tone to the analog FAX 1004.

In step S6004, the analog FAX 1004 transmits a called station identification (CED) having an analog tone to the T.38 GW 1005. In step S6005, the T.38 GW 1005 converts the CED having an analog tone into a T.38 CED, and transmits the T.38 CED to the IPFAX1 1001. In step S6006, the analog FAX 1004 transmits a T.30 DIS to the T.38 GW 1005. In step S6007, the T.38 GW 1005 converts the T.30 DIS into T.38 DIS data, and transmits the T.38 DIS to the IPFAX1 1001.

In this example, the IPFAX1 1001 analyzes a bit 3 (a bit indicating whether T.38 communication is effective or ineffective) and a bit 121 (a bit indicating whether a flow control capability for T.38 communication is effective or ineffective) of the received T.38 DIS. As a result, in steps S6008 and S6009, the IPFAX1 1001 understands that a communication partner to which image transmission is to be performed is the analog FAX 1004 beyond the T.38 GW 1005.

Figure 7:
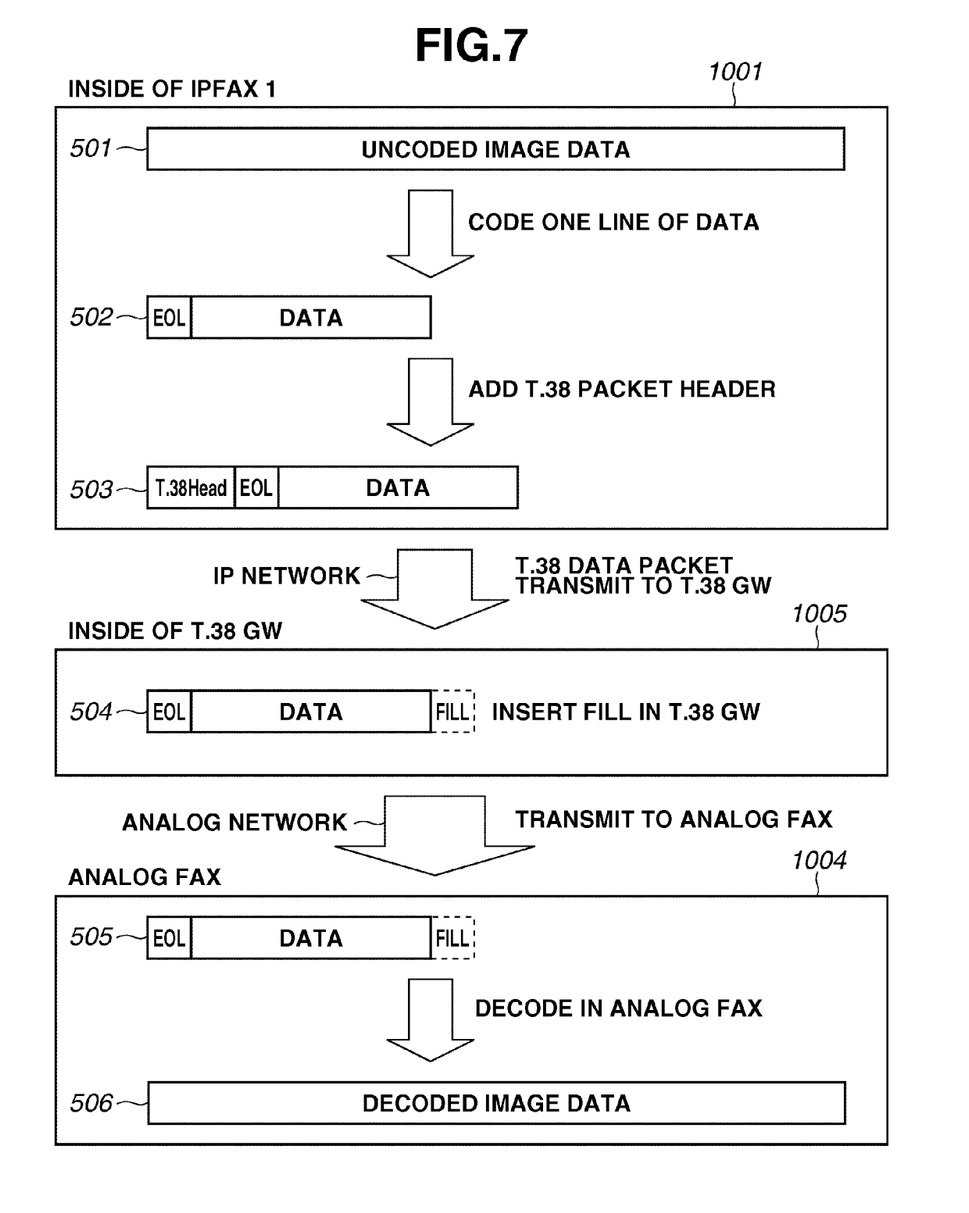
FIG. 7 illustrates an example of information processing related to image data within an IPFAX, a T.38 GW, and an analog FAX during non-ECM transmission according to a second exemplary embodiment.

Then, a training check frame (TCF) and a confirmation to receive (CFR) are exchanged therebetween respectively in step S6010 and in steps S6011 and S6012, this technique is known, and hence description thereof is omitted. The image communication performed in steps S6013 and S6014 corresponds to data transmission which is performed from the IPFAX1 1001 to the analog FAX 1004 via the T.38 GW 1005, as illustrated in FIG. 3 and FIG. 4, and FIG. 7, described below.

In step S6015, the session is disconnected. More specifically, the IPFAX1 1001 issues a BYE message of the SIP, and the T.38 GW 1005, which has received the BYE message, opens a line to the analog FAX 1004.

Figure 6:
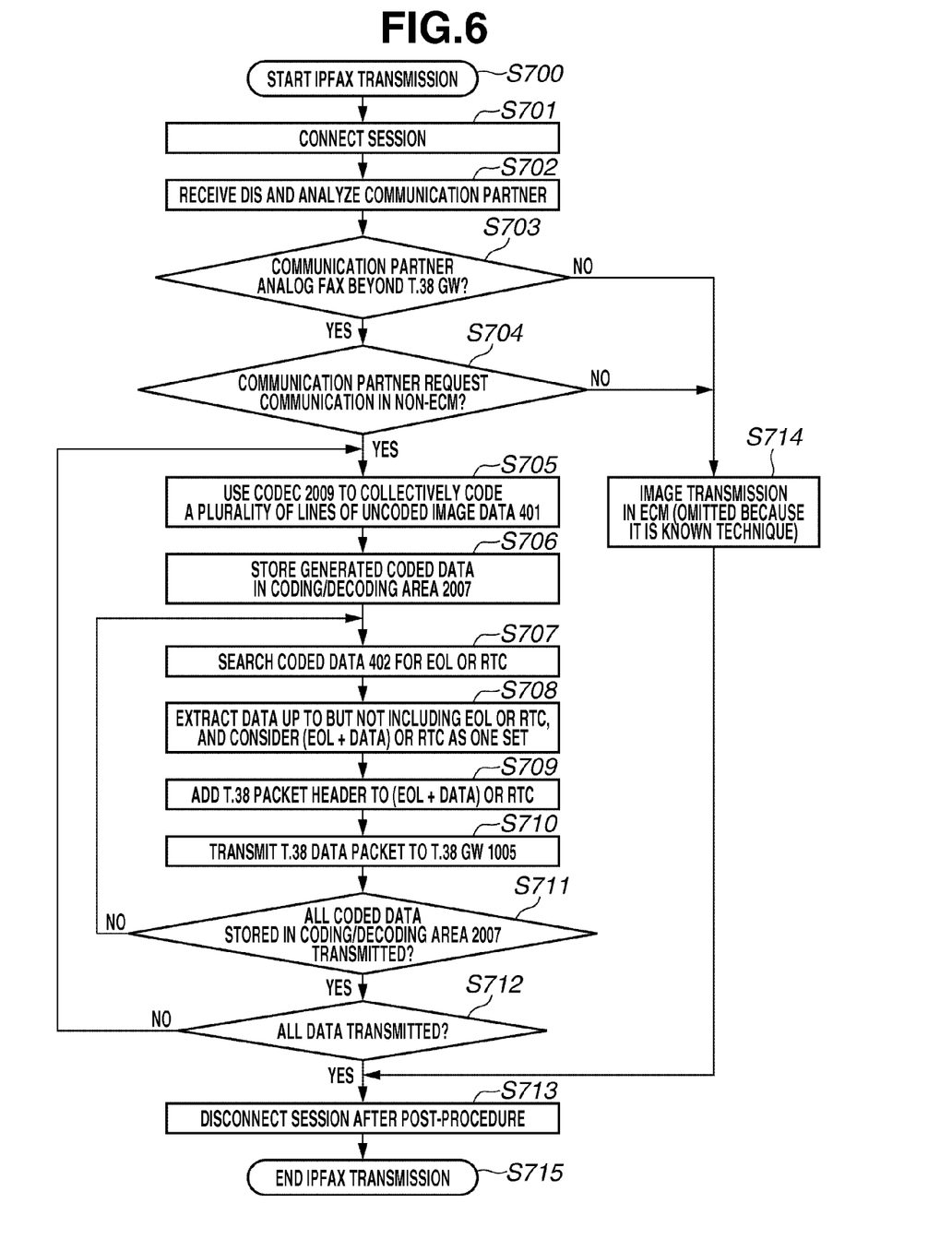
FIG. 6 is a flowchart illustrating an example of information processing performed when image transmission is performed from an IPFAX to an analog FAX beyond a T.38 GW according to the first exemplary embodiment.

FIG. 6 is a flowchart illustrating an example of information processing performed when image transmission is performed from the IPFAX1 1001 to the analog FAX 1004 beyond the T.38 GW 1005 according to the first exemplary embodiment. In step S700, a user first attempts to perform IPFAX transmission.

In step S701, the CPU 2004 transmits a session connection request. The session connection request is an INVITE message if the SIP is used. Then, session connection is performed. In step S702, the CPU 2004 receives a DIS from a communication partner using means in the above-described sequence. In step S703, the CPU 2004 determines whether the communication partner is the analog FAX 1004 beyond the T.38 GW 1005 using means in the above-described sequence.

If the communication partner is the analog FAX 1004 beyond the T.38 GW 1005 (YES in step S703), the processing proceeds to step S704. If the communication partner is the IPFAX2 1003 connected to the public IP network 1002 (NO in step S703), the processing proceeds to step S714. In step S704, the CPU 2004 determines whether the communication partner requests communication in non-ECM. If the communication partner requests communication in non-ECM (YES in step S704), the processing proceeds to step S705. If the communication partner requests communication in ECM (NO in step S704), the processing proceeds to step S714.

In step S705, the CPU 2004 causes the CODEC 2009 to collectively code a plurality of lines of uncoded image data 401. The coding is processing performed on software or hardware. In step S706, the CPU 2004 stores coded data 402 which has been generated in step S705 in the coding/decoding area 2007.

In step S707, the CPU 2004 searches the coded data 402 stored in the coding/decoding area 2007 for EOL and RTC. In step S708, the CPU 2004 extracts data up to but not including EOL which has been searched for in step 707 and considers data (EOL+DATA) 403 illustrated in FIG. 4 as one set. Alternatively, if RTC is found, the CPU 2004 considers data including only RTC, like data 406, as one set.

In step S709, the CPU 2004 adds a T.38 packet header to the data (EOL+DATA) 403 and the data (including only RTC) 406, which have been obtained in step S708. In step S710, the CPU 2004 transmits the data (EOL+DATA) 403 to which the T.38 packet header has been added in step S709 to the T.38 GW 1005. Alternatively, the CPU 2004 transmits the data (including only RTC) 406 to which the T.38 packet header has been added to the T.38 GW 1005.

In step S711, the CPU 2004 determines whether the all coded data pieces which have been stored in the coding/decoding area 2007 are transmitted. If the all coded data pieces have not been transmitted (NO in step S711), the processing returns to step S707 and is repeated therefrom. If the all coded data pieces have been transmitted (YES in step S711), the processing proceeds to step S712.

In step S712, the CPU 2004 determines whether all data pieces have been transmitted. If all data pieces have been transmitted (YES in step S712), the processing proceeds to step S713. If all data pieces have not been transmitted (NO in step S712), the processing returns to step S705 and is repeated therefrom. In step S713, the CPU 2004 disconnects the session after performing post-processing using T.38 (this is a known technique, and hence description thereof is omitted).

In step S714, the CPU 2004 performs image transmission in ECM using the T.38 protocol (this is a known technique, and hence description thereof is omitted). In step S715, the IPFAX transmission is completed.

While the data including only RTC, like the data 406 illustrated in FIG. 4, is handled as an independent set according to the present exemplary embodiment, (EOL+DATA+RTC) may be handled as an independent set. This is because, also in this case, zero data is not inserted into the middle of the coded data.

FIG. 7 illustrates a flow related to image data within an IPFAX1 1001, a T.38 GW 1005, and an analog FAX 1004 during non-ECM transmission and processing according to a second exemplary embodiment. An image scanned by an image reading unit 2003 in the IPFAX1 1001 is stored as uncoded image data 501 in a transmitted/received image storage area 2006 in the IPFAX1 1001.

According to the present exemplary embodiment, when a CODEC 2009 in the IPFAX1 1001 codes the uncoded image data 501, the CODEC 2009 generates coded data 502 including EOL and one line of data every time one line of data is coded, and adds a T.38 packet header to the coded data 502, to obtain data 503. The IPFAX1 1001 transmits the data 503 as a T.38 data packet to the T.38 GW 1005.

As described above, the IPFAX1 1001 performs data transmission to the T.38 GW 1005 according to a speed determined by exchanging a capability between the T.38 GW 1005 and the analog FAX 1004. The T.38 GW 1005 converts a T.38 protocol within the T.38 data packet which has been received from the IPFAX1 1001 into a T.30 protocol in real time, and transmits the T.38 data packet to the analog FAX 1004. If the speed of the data 503 to be transmitted from the IPFAX1 1001 to the T.38 GW 1005 is lower than the capability exchange speed, the T.38 GW 1005 inserts FILL into the data 503 as the T.38 data packet to obtain data 504. The T.38 GW 1005 transmits the data 504 to the analog FAX 1004 after the speed thereof is matched with the capability exchange speed. In this case, the T.38 GW 1005 inserts FILL behind DATA, like in the data 504. While only one line is illustrated in FIG. 7, T.38 data packets are actually transmitted sequentially from the IPFAX1 1001 to the T.38 GW 1005 and from the T.38 GW 1005 to the analog FAX 1004.

According to the present exemplary embodiment, in non-ECM image data 505 which has been received by the analog FAX 2004, as described above, FILL (zero data) exists behind DATA. In this case, the image data 505 can be decoded into image data 506 because it is not destroyed by FILL.

The second exemplary embodiment aims at preventing, when the CODEC 2009 codes the uncoded image data 501 in the IPFAX1 1001, FILL from being inserted into the middle of one line of the data by transmitting the data to the T.38 GW 1005 every time one line of the data is coded. Handling of RTC is similar to that according to the first exemplary embodiment.

Figure 8:
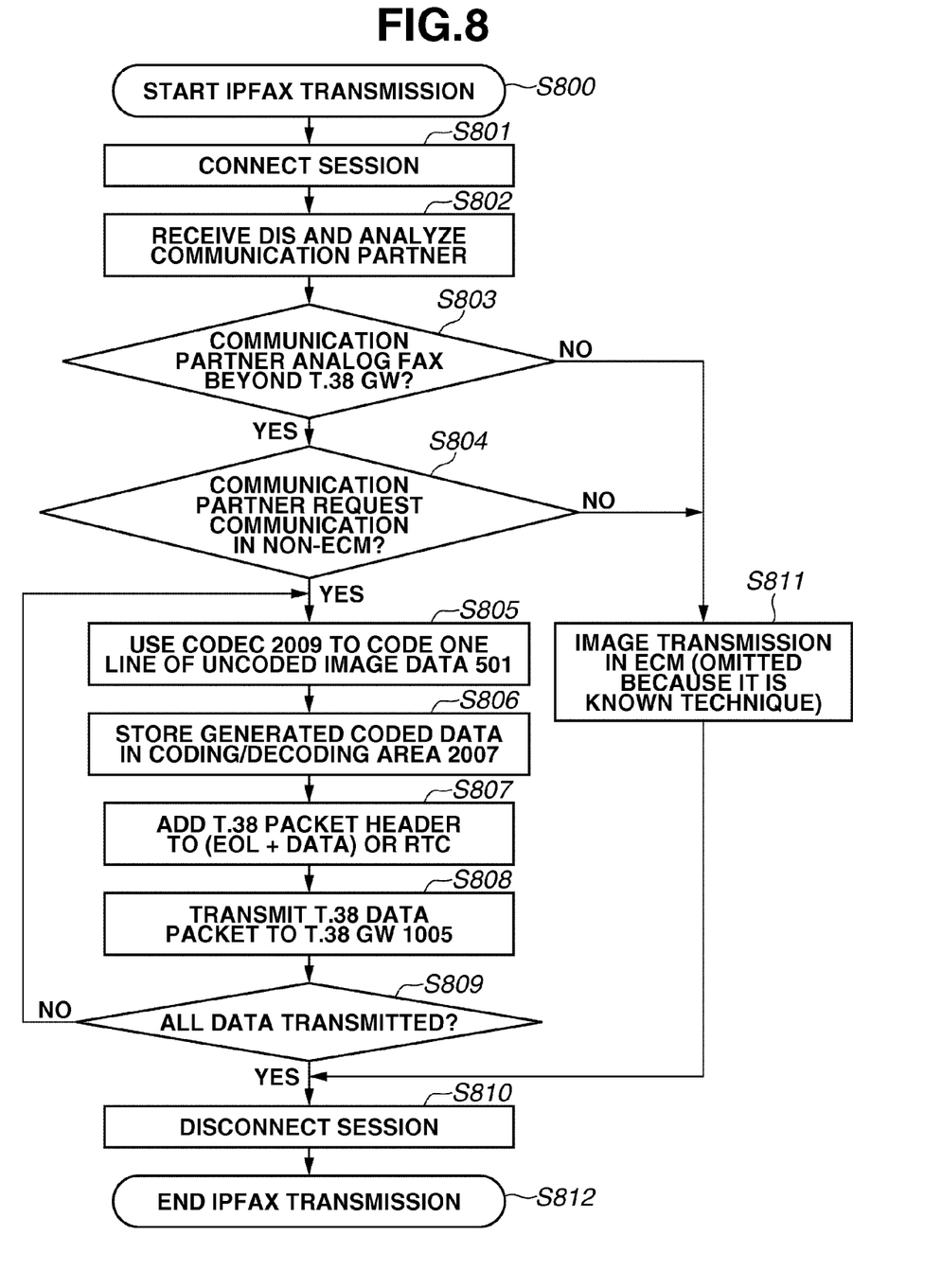
FIG. 8 is a flowchart illustrating an example of information processing performed when image transmission is performed from an IPFAX to an analog FAX beyond a T.38 GM according to the second exemplary embodiment.

FIG. 8 is a flowchart illustrating an example of information processing performed when image transmission is performed from the IPFAX1 1001 to the analog FAX 2004 beyond the T.38 GW 1005 according to the second exemplary embodiment.

In step S800, a user first attempts to perform IPFAX transmission. In step S801, a CPU 2004 transmits a session connection request. The session connection request is an INVITE message if the SIP is used. Then, session connection is performed.

In step S802, the CPU 2004 receives a DIS from a communication partner using means also described in the first exemplary embodiment. In step S803, the CPU 2004 determines whether the communication partner is the analog FAX 1004 beyond the T.38 GW 1005 using means also described in the first exemplary embodiment.

If the communication partner is the analog FAX 1004 beyond the T.38 GW 1005 (YES in step S803), the processing proceeds to step S804. If the communication partner is the IPFAX2 1003 connected to the public IP network 1002 (NO in step S703), the processing proceeds to step S811.

In step S804, the CPU 2004 determines whether the communication partner requests communication in non-ECM. If the communication partner requests communication in non-ECM (YES in step S804), the processing proceeds to step S805. If the communication partner requests communication in ECM (NO in step S804), the processing proceeds to step S811.

In step S805, the CPU 2004 causes the CODEC 2009 to code one line of uncoded data 801. The coding is processing performed on software or hardware. In step S806, the CPU 2004 stores coded data 502 which has been generated in step S805 in the coding/decoding area 2007.

In step S807, the CPU 2004 adds a T.38 packet header to the coded data (EOL+DATA) 502, to obtain data 503. If only RTC has been found, the CPU 2004 adds a T.38 packet header to RTC. In step S808, the CPU 2004 transmits the coded data (EOL+DATA) 503 to which the T.38 packet header has been added in step S807 to the T.38 GW 1005. Alternatively, the CPU 2004 transmits RTC to which the T.38 packet header has been added to the T.38 GW 1005.

In step S809, the CPU 2004 determines whether the all coded data pieces have been transmitted. If the all coded data pieces have been transmitted (YES in step S809), the processing proceeds to step S812. If the all coded data pieces have not been transmitted (NO in step S809), the processing returns to step S805 and is repeated therefrom. In step S810, the CPU 2004 disconnects the session after performing post-processing using T.38 (this is a known technique, and hence description thereof is omitted).

In step S811, the CPU 2004 performs image transmission in ECM using a T.38 protocol (this is a known technique, and hence description thereof is omitted). In step S812, the IPFAX transmission is completed.

Figure 9:
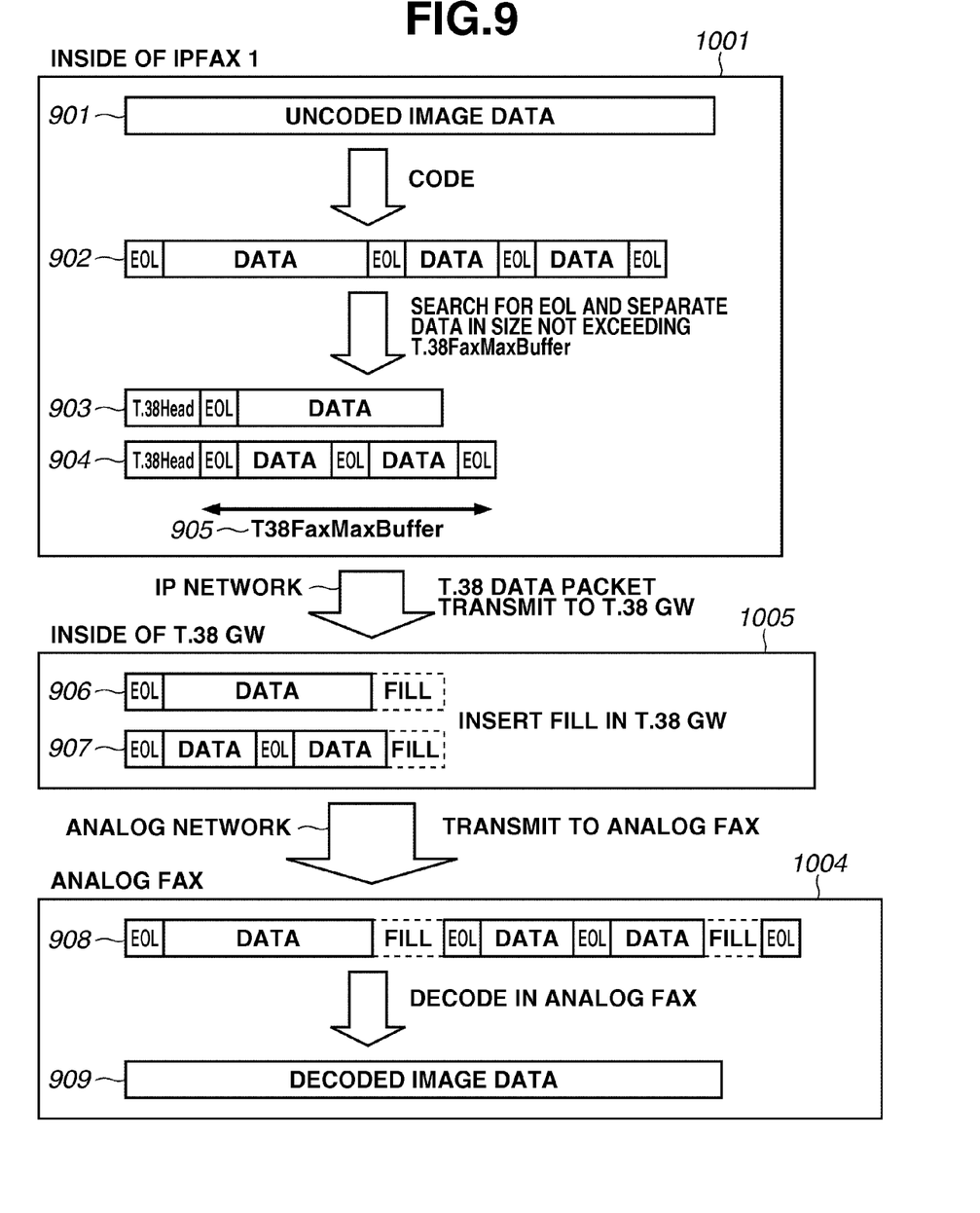
FIG. 9 illustrates an example of information processing related to image data within an IPFAX, a T.38 GW, and an analog FAX during non-ECM transmission according to a third exemplary embodiment.

FIG. 9 illustrates a flow related to image data within an IPFAX1 1001, a T.38 GW 1005, and an analog FAX 1004 during non-ECM transmission and processing according to a third exemplary embodiment. According to the present exemplary embodiment, the IPFAX1 1001 packs data including a plurality of lines into one T.38 data packet, and transmits the T.38 data packet.

The IPFAX1 1001 first receives an item of a session description protocol (SDP), i.e., T38FaxMaxBuffer (a maximum value of a size (byte) that can be stored in a remote device before an overflow state occurs) 905 from the T.38 GW 1005.

An image scanned by an image reading unit 2003 in the IPFAX1 1001 is stored as uncoded image data 901 in a transmitted/received image storage area 2006 in the IPFAX1 1001. A CODEC 2009 in the IPFAX1 1001 codes the uncoded image data 901. Coded data 902 is temporarily stored in a coding/decoding area 2007 in the IPFAX1 1001.

A CPU 2004 searches for the coded data 902 from the start of one line up to but not including EOL or RTC. In this case, the CPU 2004 calculates a size from EOL to the start of the subsequent line or from EOL up to but not including RTC (I.e., a size of one line). The CPU 2004 calculates the size of the subsequent line using similar means, and considers a plurality of lines (data 904) as one set in a range in which the total of the sizes of the lines does not exceed the T38FaxMaxBuffer 905. The CPU 2004 adds a T.38 packet header to the data and transmits the data as a T.38 data packet to the T.38 GW 1005.

As described above, the IPFAX1 1001 performs data transmission to the T.38 GW 1005 according to a speed determined by exchanging a capability between the T.38 GW 1005 and the analog FAX 1004. The T.38 GW 1005 converts a T.38 protocol within the T.38 data packet which has been received from the IPFAX1 1001 into a T.30 protocol in real time, and transmits the T.30 protocol to the analog FAX 1004. If the speed of the data to be transmitted from the IPFAX1 1001 to the T.38 GW 1005 is lower than the capability exchange speed, the T.38 GW 1005 inserts FILL into each of the data pieces which have been transmitted as the T.38 data packet to obtain data pieces 906 and 907. Then, the T.38 GW 1005 transmits the data pieces 906 and 907 to the analog FAX 1004 after the speed thereof is matched with the capability exchange speed. If data includes a plurality of lines, for example, the data 907, the T.38 GW 1005 inserts FILL behind DATA.

According to the present exemplary embodiment, in non-ECM image data 908 which has been received by the analog FAX 1004 as described above, FILL (zero data) is inserted right in front of EOL. Thus, the non-ECM image data 908 can be decoded into image data 909. The plurality of lines is thus packed in the T.38 data packet, and the T.38 data packet is transmitted from the IPFAX1 1001 to the T.38 GW 1005, so that the number of data packets to be transmitted from the IPFAX1 1001 to the T.38 GW 1005 can be reduced. In addition, an overhead caused by T.38 packet header and IP header transmission can be reduced.

The CPU 2004 accumulates transmission sizes every time one-line coding is performed when the uncoded image data 901 is coded. The CPU 2004 may consider data corresponding to the number of lines as one T.38 data packet at the time point where it has coded the maximum number of lines falling within a size not exceeding the T38FaxMaxBuffer 905, and transmit the T.38 data packet to the T.38 GW 1005. However, description thereof overlaps the previous description, and hence details thereof are not repeated.

Figure 10:
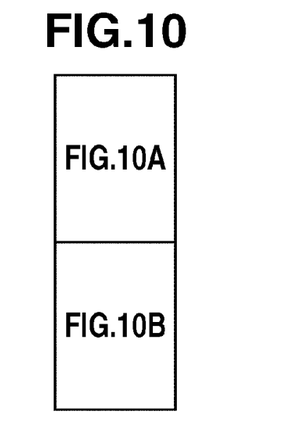
FIG. 10 (including FIGS. 10A and 10B) is a flowchart illustrating an example of information processing performed when image transmission is performed from an IPFAX to an analog FAX beyond a T.38 GM according to the third exemplary embodiment.
Figure 10A:
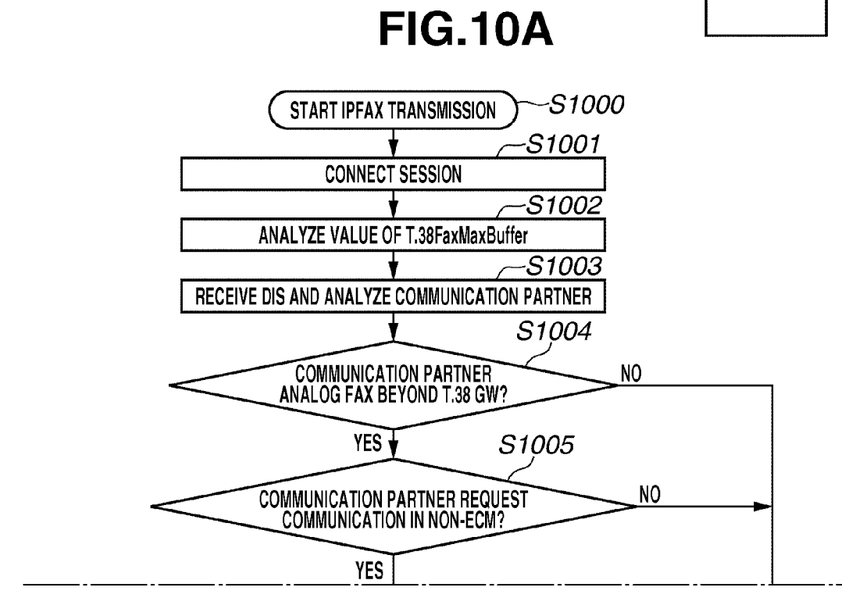
Figure 10B:
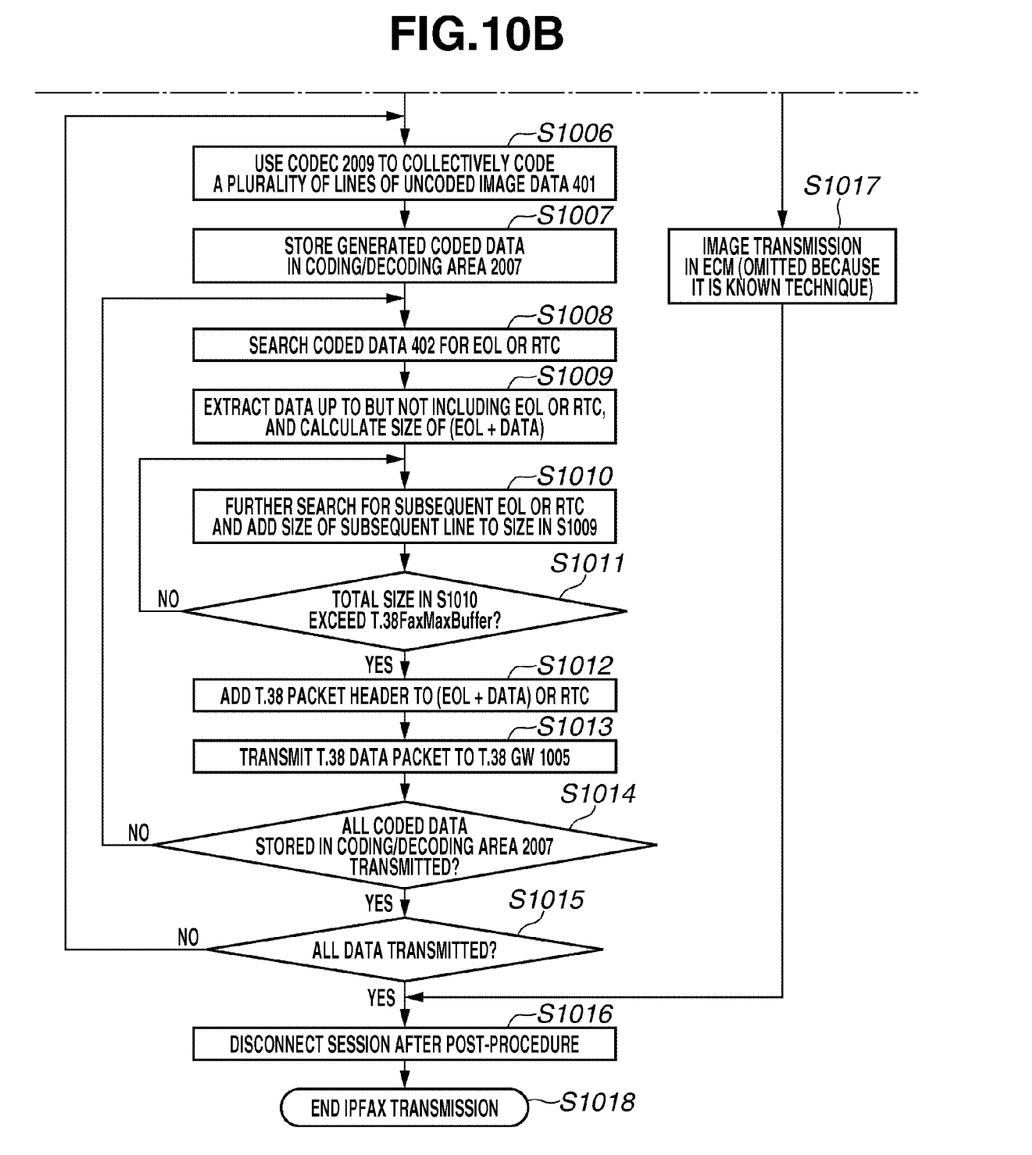

FIG. 10 (including FIGS. 10A and 10B) is a flowchart illustrating an example of information processing performed when image transmission is performed from the IPFAX1 1001 to the analog FAX 1004 beyond the T.38 GW 1005 according to the third exemplary embodiment.

In step S1000, a user first attempts to perform IPFAX transmission.

In step S1001, the CPU 2004 transmits a session connection request. The session connection request is an INVITE message if the SIP is used. Then, session connection is performed. In step S1002, the CPU 2004 refers to a session description protocol (SDP), and analyzes a value of the T38FaxMaxBuffer 905 of a type "a=".

In step S1003, the CPU 2004 receives a DIS from a communication partner using means also described in the first exemplary embodiment. In step S1004, the CPU 2004 determines whether the communication partner is the analog FAX 1004 beyond the T.38 GW 1005 using means also described in the first exemplary embodiment.

If the communication partner is the analog FAX 1004 beyond the T.38 GW 1005 (YES in step S1003), the processing proceeds to step S1005. If the communication partner is the IPFAX2 1003 connected to the public IP network 1002 (NO in step S1003), the processing proceeds to step S1017.

In step S1005, the CPU 2004 determines whether the communication partner requests communication in non-ECM. If the communication partner requests communication in non-ECM (YES in step S1005), the processing proceeds to step S1006. If the communication partner requests communication in ECM (NO in step S1005), the processing proceeds to step S1017.

In step S1006, the CPU 2004 causes the CODEC 2009 to collectively code a plurality of lines of uncoded image data 901. The coding is processing performed on software or hardware. In step S1007, the CPU 2004 stores coded data 902 which has been generated in step S1006 in the coding/decoding area 2007.

In step S1008, the CPU 2004 searches the coded data 902 stored in the coding/decoding area 2007 for EOL and RTC. In step S1009, the CPU 2004 calculates a size of the data (EOL+DATA) that has been searched for in step S1008.

In step S1010, the CPU 2004 further searches for the subsequent EOL and RTC, and calculates a size of the subsequent line. The CPU 2004 calculates the total of the size and the size calculated in step S1009.

In step S1011, the CPU 2004 determines whether the total size calculated in step S1010 exceeds the T38FaxMaxBuffer 905 which has been analyzed in step S1002. If the total size exceeds the T38FaxMaxBuffer 905 (YES in step S1011), the processing proceeds to step S1012, considering the number of lines excluding the last line that has been calculated in step S1010 as one set. If the total size does not exceed the T38FaxMaxBuffer 905 (NO in step S1011), the processing in step S1010 is repeated. In step S1010, the CPU 2004 adds the size of the subsequent line to the size calculated in step S1009.

In step S1012, the CPU 2004 adds a T.38 packet header to the data pieces 903 and 904 including (EOL+DATA) as a set. If only RTC has been found, the CPU 2004 adds a T.38 packet header to the data (only RTC) 406. In the data 904, (EOL+DATA) corresponding to two lines are collected as a set.

In step S1013, the CPU 2004 transmits the data pieces 903 and 904 to which the T.38 packet headers have been added respectively to the T.38 GW 1005. Alternatively, the CPU 2004 transmits RTC to which the T.38 packet header has been added to the T.38 GW 1005.

In step S1014, the CPU 2004 determines whether the all coded data pieces which have been stored in the coding/decoding area 2007 are transmitted. If the all coded data pieces have not been transmitted (NO in step S1014), the processing returns to step S1008 and is repeated therefrom. If the all coded data pieces have been transmitted (YES in step S1014), the processing proceeds to step S1015.

In step S1015, the CPU 2004 determines whether the all data pieces have been transmitted. If the all data pieces have been transmitted (YES in step S1015), the processing proceeds to step S1016. If the all data pieces have not been transmitted (NO in step S1015), the processing returns to step S1006 and is repeated therefrom.

In step S1016, the CPU 2004 disconnects the session after performing post-processing using T.38 (this is a known technique, and hence description thereof is omitted).

In step S1017, the CPU 2004 performs image transmission in ECM using a T.38 protocol (this is a known technique, and hence description thereof is omitted). In step S1018, the IPFAX transmission is completed.

The CPU 2004 accumulates transmission sizes every time one-line coding is performed when it codes the uncoded image data 901, and codes the maximum number of lines falling within a size not exceeding the T38FaxMaxBuffer 905. The CPU 2004 can also transmit data corresponding to the number of lines as one T.38 data packet at this time point, and transmit the T.38 data packet to the T.38 GW 1005. However, description thereof overlaps the previous description, and hence details thereof are not repeated.

While a size from EOL up to but not including RTC is set to the size of one line according to the present exemplary embodiment, a size from EOL to RTC may be the size of one line. This is because, also in this case, zero data is not inserted into the middle of the coded data.

As described above, according to each of the above-described exemplary embodiments, FAX image data in a T.38 data packet to be transmitted from the IPFAX to the T.38 GW starts at a start of a line and ends at EOL or RTC. This configuration eliminates the possibility that the T.38 GW inserts FILL into the middle of one line of data, and the data is transmitted to the analog FAX, and cannot be decoded in the analog FAX, so that image transmission is unsuccessfully performed, like in the conventional technique. Accordingly, the data can be decoded in the analog FAX connected to the gateway serving as a communication partner of the IPFAX.

Exemplary embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2012-224994 filed Oct. 10, 2012, which is hereby incorporated by reference herein in its entirety.

What is claimed is:

1. A facsimile system comprising a gateway apparatus, and a transmission-side facsimile apparatus capable of performing facsimile communication via the gateway apparatus,
    wherein the gateway apparatus includes:
    a receiving unit configured to receive a packet transmitted from the transmission-side facsimile apparatus;
    an insertion unit configured to insert predetermined data into image data included in the packet received by the receiving unit; and
    a first transmission unit configured to transmit image data into which the predetermined data is inserted by the insertion unit to a receiving-side facsimile apparatus, and
    wherein the transmission-side facsimile apparatus includes:
    a coding unit configured to code image data; and
    a second transmission unit configured to packetize image data coded by the coding unit so that one line is included in one packet, and to transmit the packetized image data to the gateway apparatus.

2. The facsimile system according to claim 1, wherein the second transmission unit transmits a packet including data representing an end of line at its head.

3. The facsimile system according to claim 1, wherein the transmission-side facsimile apparatus performs facsimile communication in which error correction is not performed with the receiving-side facsimile apparatus.

4. The facsimile system according to claim 1, wherein the predetermined data is FILL including data representing zero (0).

5. A facsimile system comprising a gateway apparatus, and a transmission-side facsimile apparatus capable of performing facsimile communication via the gateway apparatus,
    wherein the gateway apparatus includes:
    a receiving unit configured to receive a packet transmitted from the transmission-side facsimile apparatus;
    an insertion unit configured to insert predetermined data into image data included in the packet received by the receiving unit; and
    a first transmission unit configured to transmit image data into which the predetermined data is inserted by the insertion unit to a receiving-side facsimile apparatus, and
    wherein the transmission-side facsimile apparatus includes:
    a coding unit configured to code image data; and
    a second transmission unit configured to packetize image data coded by the coding unit so that data representing an end of line is included at a head of a packet, and to transmit the packetized image data to the gateway apparatus.

6. The facsimile system according to claim 5, wherein the second transmission unit transmits a packet including image data corresponding to a plurality of lines.

7. The facsimile system according to claim 5, wherein the transmission-side facsimile apparatus performs facsimile communication in which error correction is not performed with the receiving-side facsimile apparatus.

8. The facsimile system according to claim 5, wherein the predetermined data is FILL including data representing zero (0).

9. A facsimile apparatus capable of performing facsimile communication via a gateway apparatus, the facsimile apparatus comprising:
    a coding unit configured to code image data; and
    a transmission unit configured to packetize image data coded by the coding unit so that one line is included in one packet, and to transmit the packetized image data to the gateway apparatus.

10. The facsimile apparatus according to claim 9, wherein the transmission unit transmits a packet including data representing an end of line at its head.

11. The facsimile apparatus according to claim 9, wherein the facsimile apparatus performs facsimile communication in which error correction is not performed.

12. The facsimile apparatus according to claim 9, wherein the gateway apparatus inserts FILL including data representing zero (0) in a case where image data included in a packet received from the facsimile apparatus is transmitted to the receiving-side facsimile apparatus.

13. A facsimile apparatus capable of performing facsimile communication via a gateway apparatus, the facsimile apparatus comprising:
    a coding unit configured to code image data; and
    a transmission unit configured to packetize image data coded by the coding unit so that data representing an end of line is included at a head of a packet, and to transmit the packetized image data to the gateway apparatus.

14. The facsimile apparatus according to claim 13, wherein the transmission unit transmits a packet including image data corresponding to a plurality of lines.

15. The facsimile apparatus according to claim 13, wherein the facsimile apparatus performs facsimile communication in which error correction is not performed.

16. The facsimile apparatus according to claim 13, wherein the gateway apparatus inserts FILL including data representing zero (0) in a case where image data included in a packet received from the facsimile apparatus is transmitted to the receiving-side facsimile apparatus.

17. A method for communication in a facsimile system comprising a gateway apparatus, and a transmission-side facsimile apparatus capable of performing facsimile communication via the gateway apparatus, the method comprising:
    in the gateway apparatus,
    receiving a packet transmitted from the transmission-side facsimile apparatus;
    inserting predetermined data into image data included in the received packet; and
    transmitting image data into which the predetermined data is inserted to a receiving-side facsimile apparatus, and
    in the transmission-side facsimile apparatus,
    coding image data; and
    packetizing the coded image data so that one line is included in one packet, and transmitting the packetized image data to the gateway apparatus.

18. A method for communication in a facsimile system comprising a gateway apparatus, and a transmission-side facsimile apparatus capable of performing facsimile communication via the gateway apparatus, the method comprising:
in the gateway apparatus,
receiving a packet transmitted from the transmission-side facsimile apparatus;
inserting predetermined data into image data included in the received packet; and
transmitting image data into which the predetermined data is inserted to a receiving-side facsimile apparatus, and
in the transmission-side facsimile apparatus,
coding image data; and
packetizing the coded image data so that data representing an end of line is included at a head of a packet and transmitting the packetized image data to the gateway apparatus.

19. A method for controlling a transmission-side facsimile apparatus capable of performing facsimile communication via a gateway apparatus, the method comprising:
coding image data; and
packetizing the coded image data so that one line is included in one packet, and transmitting the packetized image data to the gateway apparatus.

20. A method for controlling a transmission-side facsimile apparatus capable of performing facsimile communication via a gateway apparatus, the method comprising:
coding image data; and
packetizing the coded image data so that data representing an end of line is included at a head of a packet and transmitting the packetized image data to the gateway apparatus.

21. A non-transitory computer readable storage medium storing a program for causing a computer to execute the method defined by claim 19.

22. A non-transitory computer readable storage medium storing a program for causing a computer to execute the method defined by claim 20.

* * * * *